United States Patent
Struhsaker et al.

(10) Patent No.: US 6,804,527 B2
(45) Date of Patent: Oct. 12, 2004

(54) SYSTEM FOR COORDINATION OF TDD TRANSMISSION BURSTS WITHIN AND BETWEEN CELLS IN A WIRELESS ACCESS SYSTEM AND METHOD OF OPERATION

(75) Inventors: Paul F. Struhsaker, Plano, TX (US); Kirk J. Griffin, Plano, TX (US); Michael S. Eckert, Dallas, TX (US)

(73) Assignee: Raze Technologies, Inc., Dallas, TX (US)

( * ) Notice: Subject to any disclaimer, the term of this patent is extended or adjusted under 35 U.S.C. 154(b) by 687 days.

(21) Appl. No.: 09/839,512

(22) Filed: Apr. 20, 2001

(65) Prior Publication Data

US 2002/0137533 A1 Sep. 26, 2002

Related U.S. Application Data

(60) Provisional application No. 60/263,101, filed on Jan. 19, 2001, provisional application No. 60/270,378, filed on Feb. 21, 2001, provisional application No. 60/270,385, filed on Feb. 21, 2001, and provisional application No. 60/270,430, filed on Feb. 21, 2001.

(51) Int. Cl.$^7$ ............................. H04Q 7/30; H04Q 7/20
(52) U.S. Cl. ................. 455/502; 455/503; 455/561; 455/517; 370/503; 370/508; 370/509; 370/510; 370/512; 370/350
(58) Field of Search ............................... 455/502, 503, 455/550, 561, 517, 500, 524, 525, 555, 554, 403, 422, 426; 370/503, 508, 509, 510, 512, 350, 347, 362, 321

(56) References Cited

U.S. PATENT DOCUMENTS

| | | | | |
|---|---|---|---|---|
| 4,513,415 A | * | 4/1985 | Martinez | 455/502 |
| 5,327,581 A | * | 7/1994 | Goldberg | 455/502 |
| 5,511,067 A | * | 4/1996 | Miller | 370/503 |
| 5,638,371 A | | 6/1997 | Raychaudhuri et al. | 370/347 |
| 5,684,791 A | | 11/1997 | Raychaudhuri et al. | 370/278 |
| 5,694,424 A | | 12/1997 | Ariyavisitakul | 375/233 |
| 5,754,803 A | | 5/1998 | Regis | 395/299 |
| 5,809,086 A | | 9/1998 | Ariyavisitakul | 375/332 |
| 5,991,292 A | | 11/1999 | Focsaneanu et al. | 370/352 |
| 6,157,619 A | | 12/2000 | Ozluturk et al. | 370/252 |
| 6,188,873 B1 | | 2/2001 | Wickman et al. | 455/11.1 |
| 6,496,488 B1 | * | 12/2002 | Cooley et al. | 370/503 |
| 2002/0115421 A1 | * | 8/2002 | Sharhar et al. | 455/517 |

FOREIGN PATENT DOCUMENTS

| EP | 0 437 835 A1 | 7/1991 |
|---|---|---|
| EP | 0 777 343 A2 | 6/1997 |

* cited by examiner

*Primary Examiner*—William Trost
*Assistant Examiner*—Keith Ferguson

(57) ABSTRACT

There is disclosed, for use in a first radio frequency (RF) modem shelf associated with a first one of a plurality of base stations in a fixed wireless access network, a timing distribution apparatus for synchronizing the operations of a plurality of RF modems in the first RF modem shelf. The timing distribution apparatus comprises: a) a primary master clock source for generating an internal master clock signal and an internal master framing signal; b) a plurality of interface control processors capable of synchronizing a downlink transmission of one of the plurality of RF modems; c) a synchronization bus; d) an external interface input port capable of receiving an external master synchronization signal from a second RE modem shelf; and e) an external interface output port for transmitting at least one of the internal master clock signal and the internal master framing signal to the second RF modem shelf.

20 Claims, 5 Drawing Sheets

SYSTEM FOR COORDINATION OF TDD TRANSMISSION BURSTS WITHIN AND BETWEEN CELLS IN A WIRELESS ACCESS SYSTEM AND METHOD OF OPERATION

The present invention claims priority to U.S. Provisional Application Serial No. 60/263,101 filed Jan. 19, 2001.

CROSS-REFERENCE TO RELATED APPLICATIONS

The present invention is related to those disclosed in the following United States Provisional and Non-Provisional Patent Applications:

1) Ser. No. 09/713,684, filed on Nov. 15, 2000, entitled "SUBSCRIBER INTEGRATED ACCESS DEVICE FOR USE IN WIRELESS AND WIRELINE ACCESS SYSTEMS";
2) Ser. No. 09/838,810, filed Apr. 20, 2001, entitled "WIRELESS COMMUNICATION SYSTEM USING BLOCK FILTERING AND FAST EQUALIZATION-DEMODULATION AND METHOD OF OPERATION";
3) Ser. No. 09/839,726, filed Apr. 20, 2001, entitled "APPARATUS AND ASSOCIATED METHOD FOR OPERATING UPON DATA SIGNALS RECEIVED AT A RECEIVING STATION OF A FIXED WIRELESS ACCESS COMMUNICATION SYSTEM";
4) Ser. No. 09/839,729, filed Apr. 20, 2001, entitled "APPARATUS AND METHOD FOR OPERATING A SUBSCRIBER INTERFACE IN A FIXED WIRELESS SYSTEM";
5) Ser. No. 09/839,719, filed Apr. 20, 2001, entitled "APPARATUS AND METHOD FOR CREATING SIGNAL AND PROFILES AT A RECEIVING STATION";
6) Ser. No. 09/838,910, filed Apr. 20, 2001, entitled "SYSTEM AND METHOD FOR INTERFACE BETWEEN A SUBSCRIBER MODEM AND SUBSCRIBER PREMISES INTERFACES";
7) Ser. No. 09/839,509, filed Apr. 20, 2001, entitled "BACKPLANE ARCHITECTURE FOR USE IN WIRELESS AND WIRELINE ACCESS SYSTEMS";
8) Ser. No. 09/839,514, filed Apr. 20, 2001, entitled "SYSTEM AND METHOD FOR ON-LINE INSERTION OF LINE REPLACEABLE UNITS IN WIRELESS AND WIRELINE ACCESS SYSTEMS";
9) Ser. No. 09/839,259, filed Apr. 20, 2001, entitled "REDUNDANT TELECOMMUNICATION SYSTEM USING MEMORY EQUALIZATION APPARATUS AND METHOD OF OPERATION";
10) Ser. No. 09/839,457, filed Apr. 20, 2001, entitled "WIRELESS ACCESS SYSTEM FOR ALLOCATING AND SYNCHRONIZING UPLINK AND DOWNLINK OF TDD FRAMES AND METHOD OF OPERATION";
11) Ser. No. 09/839,075, filed Apr. 20, 2001, entitled "TDD FDD AIR INTERFACE";
12) Ser. No. 09/839,499, filed Apr. 20, 2001, entitled "APPARATUS, AND AN ASSOCIATED METHOD, FOR PROVIDING WLAN SERVICE IN A FIXED WIRELESS ACCESS COMMUNICATION SYSTEM";
13) Ser. No. 09/839,458, filed Apr. 20, 2001, entitled "WIRELESS ACCESS SYSTEM USING MULTIPLE MODULATION";
14) Ser. No. 09/839,456, filed Apr. 20, 2001, entitled "WIRELESS ACCESS SYSTEM AND ASSOCIATED METHOD USING MULTIPLE MODULATION FORMATS IN TDD FRAMES ACCORDING TO SUBSCRIBER SERVICE TYPE";
15) Ser. No. 09/838,924, filed Apr. 20, 2001, entitled "APPARATUS FOR ESTABLISHING A PRIORITY CALL IN A FIXED WIRELESS ACCESS COMMUNICATION SYSTEM";
16) Ser. No. 09/839,727, filed Apr. 20, 2001, entitled "APPARATUS FOR REALLOCATING COMMUNICATION RESOURCES TO ESTABLISH A PRIORITY CALL IN A FIXED WIRELESS ACCESS COMMUNICATION SYSTEM";
17) Ser. No. 09/839,734, filed Apr. 20, 2001, entitled "METHOD FOR ESTABLISHING A PRIORITY CALL IN A FIXED WIRELESS ACCESS COMMUNICATION SYSTEM";
18) Ser. No. 09/839,513, filed Apr. 20, 2001, entitled "SYSTEM AND METHOD FOR PROVIDING AN IMPROVED COMMON CONTROL BUS FOR USE IN ON-LINE INSERTION OF LINE REPLACEABLE UNITS IN WIRELESS AND WIRELINE ACCESS SYSTEMS";
19) Serial No. 60/262,712, filed on Jan. 19, 2001, entitled "WIRELESS COMMUNICATION SYSTEM USING BLOCK FILTERING AND FAST EQUALIZATION-DEMODULATION AND METHOD OF OPERATION";
20) Serial No. 60/262,825, filed on Jan. 19, 2001, entitled "APPARATUS AND ASSOCIATED METHOD FOR OPERATING UPON DATA SIGNALS RECEIVED AT A RECEIVING STATION OF A FIXED WIRELESS ACCESS COMMUNICATION SYSTEM";
21) Serial No. 60/262,698, filed on Jan. 19, 2001, entitled "APPARATUS AND METHOD FOR OPERATING A SUBSCRIBER INTERFACE IN A FIXED WIRELESS SYSTEM";
22) Serial No. 60/262,827, filed on Jan. 19, 2001, entitled "APPARATUS AND METHOD FOR CREATING SIGNAL AM) PROFILES AT A RECEIVING STATION";
23) Serial No. 60/262,826, filed on Jan. 19, 2001, entitled "SYSTEM AND METHOD FOR INTERFACE BETWEEN A SUBSCRIBER MODEM AND SUBSCRIBER PREMISES INTERFACES";
24) Serial No. 60/262,951, filed on Jan. 19, 2001, entitled "BACKPLANE ARCHITECTURE FOR USE IN WIRELESS AND WIRELINE ACCESS SYSTEMS";
25) Serial No. 60/262,824, filed on Jan. 19, 2001, entitled "SYSTEM AND METHOD FOR ON-LINE INSERTION OF LINE REPLACEABLE UNITS IN WIRELESS AND WIRELINE ACCESS SYSTEMS";
26) Serial No. 60/263,097, filed on Jan. 19, 2001, entitled "REDUNDANT TELECOMMUNICATION SYSTEM USING MEMORY EQUALIZATION APPARATUS AND METHOD OF OPERATION";
27) Serial No. 60/273,579, filed Mar. 5, 2001, entitled "WIRELESS ACCESS SYSTEM FOR ALLOCATING AND SYNCHRONIZING UPLINK AND DOWNLINK OF TDD FRAMES AND METHOD OF OPERATION";
28) Serial No. 60/262,955, filed Jan. 19, 2001, entitled "TDD FDD AIR INTERFACE";
29) Serial No. 60/262,708, filed on Jan. 19, 2001, entitled "APPARATUS, AND AN ASSOCIATED METHOD, FOR PROVIDING WLAN SERVICE IN A FIXED WIRELESS ACCESS COMMUNICATION SYSTEM";
30) Serial No. 60/273,689, filed Mar. 5, 2001, entitled "WIRELESS ACCESS SYSTEM USING MULTIPLE MODULATION";
31) Serial No. 60/273,757, filed Mar. 5, 2001, entitled "WIRELESS ACCESS SYSTEM AND ASSOCIATED METHOD USING MULTIPLE MODULATION FORMATS IN TDD FRAMES ACCORDING TO SUBSCRIBER SERVICE TYPE";
32) Serial No. 60/270,378, filed Feb. 21, 2001, entitled "APPARATUS FOR ESTABLISHING A PRIORITY CALL IN A FIXED WIRELESS ACCESS COMMUNICATION SYSTEM";

33) Serial No. 60/270,385, filed Feb. 21, 2001, entitled "APPARATUS FOR REALLOCATING COMMUNICATION RESOURCES TO ESTABLISH A PRIORITY CALL IN A FIXED WIRELESS ACCESS COMMUNICATION SYSTEM"; and 34) Serial No. 60/270,430, filed Feb. 21, 2001, entitled "METHOD FOR ESTABLISHING A PRIORITY CALL IN A FIXED WIRELESS ACCESS COMMUNICATION SYSTEM".

The above applications are commonly assigned to the assignee of the present invention. The disclosures of these related patent applications are hereby incorporated by reference for all purposes as if fully set forth herein.

TECHNICAL FIELD OF THE INVENTION

The present invention is directed, in general, to wireless access systems and, more specifically, to a system for coordinating TDD transmission bursts between sectors in a single cell and between cells in a cellular network.

BACKGROUND OF THE INVENTION

Telecommunications access systems provide for voice, data, and multimedia transport and control between the central office (CO) of the telecommunications service provider and the subscriber (customer) premises. Prior to the mid-1970s, the subscriber was provided phone lines (e.g., voice frequency (VF) pairs) directly from the Class 5 switching equipment located in the central office of the telephone company. In the late 1970s, digital loop carrier (DLC) equipment was added to the telecommunications access architecture. The DLC equipment provided an analog phone interface, voice CODEC, digital data multiplexing, transmission interface, and control and alarm remotely from the central office to cabinets located within business and residential locations for approximately 100 to 2000 phone line interfaces. This distributed access architecture greatly reduced line lengths to the subscriber and resulted in significant savings in both wire installation and maintenance. The reduced line lengths also improved communication performance on the line provided to the subscriber.

By the late 1980s, the limitations of data modem connections over voice frequency (VF) pairs were becoming obvious to both subscribers and telecommunications service providers. ISDN (Integrated Services Digital Network) was introduced to provide universal 128 kbps service in the access network. The subscriber interface is based on 64 kbps digitization of the VF pair for digital multiplexing into high speed digital transmission streams (e.g., T1/T3 lines in North America, E1/E3 lines in Europe). ISDN was a logical extension of the digital network that had evolved throughout the 1980s. The rollout of ISDN in Europe was highly successful. However, the rollout in the United States was not successful, due in part to artificially high tariff costs which greatly inhibited the acceptance of ISDN.

More recently, the explosion of the Internet and deregulation of the telecommunications industry have brought about a broadband revolution characterized by greatly increased demands for both voice and data services and greatly reduced costs due to technological innovation and intense competition in the telecommunications marketplace. To meet these demands, high speed DSL (digital subscriber line) modems and cable modems have been developed and introduced. The DLC architecture was extended to provide remote distributed deployment at the neighborhood cabinet level using DSL access multiplexer (DSLAM) equipment. The increased data rates provided to the subscriber resulted in upgrade DLC/DSLAM transmission interfaces from T1/E1interfaces (1.5/2.0 Mbps) to high speed DS3 and OC3 interfaces. In a similar fashion, the entire telecommunications network backbone has undergone and is undergoing continuous upgrade to wideband optical transmission and switching equipment.

Similarly, wireless access systems have been developed and deployed to provide broadband access to both commercial and residential subscriber premises. Initially, the market for wireless access systems was driven by rural radiotelephony deployed solely to meet the universal service requirements imposed by government (i.e., the local telephone company is required to serve all subscribers regardless of the cost to install service). The cost of providing a wired connection to a small percentage of rural subscribers was high enough to justify the development and expense of small-capacity wireless local loop (WLL) systems.

Deregulation of the local telephone market in the United States (e.g., Telecommunications Act of 1996) and in other countries shifted the focus of fixed wireless access (FWA) systems deployment from rural access to competitive local access in more urbanized areas. In addition, the age and inaccessibility of much of the older wired telephone infrastructure makes FWA systems a cost-effective alternative to installing new, wired infrastructure. Also, it is more economically feasible to install FWA systems in developing countries where the market penetration is limited (i.e., the number and density of users who can afford to pay for services is limited to small percent of the population) and the rollout of wired infrastructure cannot be performed profitably. In either case, broad acceptance of FWA systems requires that the voice and data quality of FWA systems must meet or exceed the performance of wired infrastructure.

Wireless access systems must address a number of unique operational and technical issues including:

1) Relatively high bit error rates (BER) compared to wire line or optical systems; and
2) Transparent operation with network protocols and protocol time constraints for the following protocols:
   a) ATM;
   b) Class 5 switch interfaces (domestic GR-303 and international V5.2);
   c) TCP/IP with quality-of-service QoS for voice over IP (VOIP) (i.e., RTP) and other H.323 media services;
   d) Distribution of synchronization of network time out to the subscribers;
3) Increased use of voice, video and/or media compression and concentration of active traffic over the air interface to conserve bandwidth;
4) Switching and routing within the access system to distribute signals from the central office to multiple remote cell sites containing multiple cell sectors and one or more frequencies of operation per sector; and
5) Remote support and debugging of the subscriber equipment, including remote software upgrade and provisioning.

Unlike physical optical or wire systems that operate at bit error rates (BER) of $10^{-11}$, wireless access systems have time varying channels that typically provide bit error rates of $10^{-3}$ to $10^{-6}$. The wireless physical (PHY) layer interface and the media access control (MAC) layer interface must provide modulation, error correction and ARQ protocol that can detect and, where required, correct or retransmit corrupted data so that the interfaces at the network and at the subscriber site operate at wire line bit error rates.

The wide range of equipment and technology capable of providing either wireline (i.e., cable, DSL, optical) broadband access or wireless broadband access has allowed service providers to match the needs of a subscriber with a suitable broadband access solution. However, in many areas, the cost of cable modem or DSL service is high. Additionally, data rates may be slow or coverage incomplete due to line lengths. In these areas and in areas where the high cost of replacing old telephone equipment or the low density of subscribers makes it economically unfeasible to introduce either DSL or cable modem broadband access, fixed wireless broadband systems offer a viable alternative. Fixed wireless broadband systems use a group of transceiver base stations to cover a region in the same manner as the base stations of a cellular phone system. The base stations of a fixed wireless broadband system transmit forward channel (i.e., downstream) signals in directed beams to fixed location antennas attached to the residences or offices of subscribers. The base stations also receive reverse channel (i.e., upstream) signals transmitted by the broadband access equipment of the subscriber.

A common protocol used in the air interface between the base stations and the subscriber fixed wireless access (FWA) devices is time division duplex transmission. In TDD systems, the same channel is used for both transmitting and receiving. During a downlink time slot, the base stations transmit and the subscriber FWA devices receive. During an uplink time slot, the subscriber FWA devices transmit and the base station receive.

However, the difference between transmitted power and received power at a base station cell site can be on the order of 100 db. For a cell with multiple sectors collocated at the same cell site, if the TDD transmit and receive time slots are not properly synchronized, the system suffers from self interference. While low side lobe antennas and large separation of frequencies can minimize the self interference at the cell, these techniques increase antenna cost and reduce spectral efficiency, since fewer frequencies can be used in a given cell. This problem extends to cell-to-cell interference where uncoordinated transmissions increase the level of interference (carrier-to-interference ratio, C/I) for a receiver.

Therefore, there is a need in the art for time division duplex (TDD) fixed wireless access (FWA) systems that minimize interference between cell sites and between sectors within a single cell site. In particular, there is a need for time division duplex (TDD) fixed wireless access systems that implement improved timing and synchronization circuitry that coordinates the transmission and reception of TDD data bursts in the uplink and downlink time slots. More particularly, there is a need for timing and synchronization circuitry that provides highly accurate synchronization of the uplink and downlink time slots within sectors in a single cell site and between multiple cells sites in order to reduce both self interference and cell-to-cell interference.

SUMMARY OF THE INVENTION

To address the above-discussed deficiencies of the prior art, it is a primary object of the present invention to provide, for use in a wireless access network, a timing apparatus that coordinates all TDD modems and sectors in a given cell (including multiple frequencies per sector). The present invention also provides a distributed timing source to coordinate timing between cells. More particularly, the present invention comprises a remote RF modem shelf that distributes a timing pulse (e.g., one second) via a system timing distribution structure to all the RF modems in the remote RF modem shelf. The timing source may be internally generated or may be generated by an external source, such as another RF modem shelf or a global positioning system (GPS) source. Where two or more cell sites are used, a GPS timing source at each remote RF modem shelf provides a coordinated one second pulse which is accurate across all cell sites to better than 100 nanoseconds. According to an exemplary embodiment, an integer number of TDD bursts occur over the one second period (e.g., five hundred (500) TDD bursts, each of two millisecond duration, over the one second period).

The management system of the fixed wireless access network provides aggregated measurement of traffic flow for the downlink and uplink. Each RF modem measures demand per sector. Each remote RF modem shelf measures the aggregate for a particular cell site. An access processor that controls a number of remote RF modem shelves measures the aggregate for part of the fixed wireless access network. Finally, multiple access processors that cover a defined geographical area may aggregate measurements through the management system of the fixed wireless access network. The management system may send TDD duration coordination messages to all remote RF modem shelves through a hierarchical management capability.

Accordingly, it is a primary object of the present invention to provide, for use in a first radio frequency (RF) modem shelf associated with a first one of a plurality of base stations in a fixed wireless access network, a timing distribution apparatus for synchronizing the operations of a plurality of RF modems in the first RF modem shelf. According to an advantageous embodiment of the present invention, the timing distribution apparatus comprises: a) a primary master clock source capable of generating an internal master clock signal and an internal master framing signal; b) a plurality of interface control processors, each of the interface control processors capable of receiving the internal master clock signal and the internal master framing signal and capable of using the internal master clock signal and the internal master framing signal to synchronize a downlink transmission of one of the plurality of RF modems; c) a synchronization bus capable of distributing the internal master clock signal and the internal master framing signal from the primary master clock source to the plurality of interface control processors; d) an external interface input port capable of receiving at least one external master synchronization signal from a second RF modem shelf in the fixed wireless access network; and e) an external interface output port capable of receiving at least one of the internal master clock signal and the internal master framing signal from the primary master clock source and transmitting the at least one of the internal master clock signal and the internal master framing signal to the second RF modem shelf.

According to one embodiment of the present inventions the timing distribution apparatus further comprises a secondary master clock source capable of generating the internal master clock signal and the internal master framing signal.

According to another embodiment of the present invention, the synchronization bus comprises a primary timing bus capable of distributing the internal master clock signal and the internal master framing signal from the primary master clock source and a secondary timing bus capable of distributing the internal master clock signal and the internal master framing signal from the secondary master clock source.

According to still another embodiment of the present invention, the primary master clock source generates the internal master clock signal and the internal master framing signal from the at least one external master synchronization signal.

According to yet another embodiment of the present invention, the secondary master clock source generates the internal master clock signal and the internal master framing signal from the at least one external master synchronization signal.

According to a further embodiment of the present invention, the external interface input port is further capable of receiving a building integrated timing supply (BITS) reference signal from a locally disposed external clock source.

According to a still further embodiment of the present invention, the primary master clock source generates the internal master clock signal and the internal master framing signal from the BITS reference signal.

According to a yet further embodiment of the present invention, the secondary master clock source generates the internal master clock signal and the internal master framing signal from the BITS reference signal.

In one embodiment of the present invention, the external interface input port is further capable of receiving a global positioning system (GPS) reference signal from an external GPS clock source.

In another embodiment of the present invention, the primary master clock source generates the internal master clock signal and the internal master framing signal from the GPS reference signal.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless access system.

Figure 1:
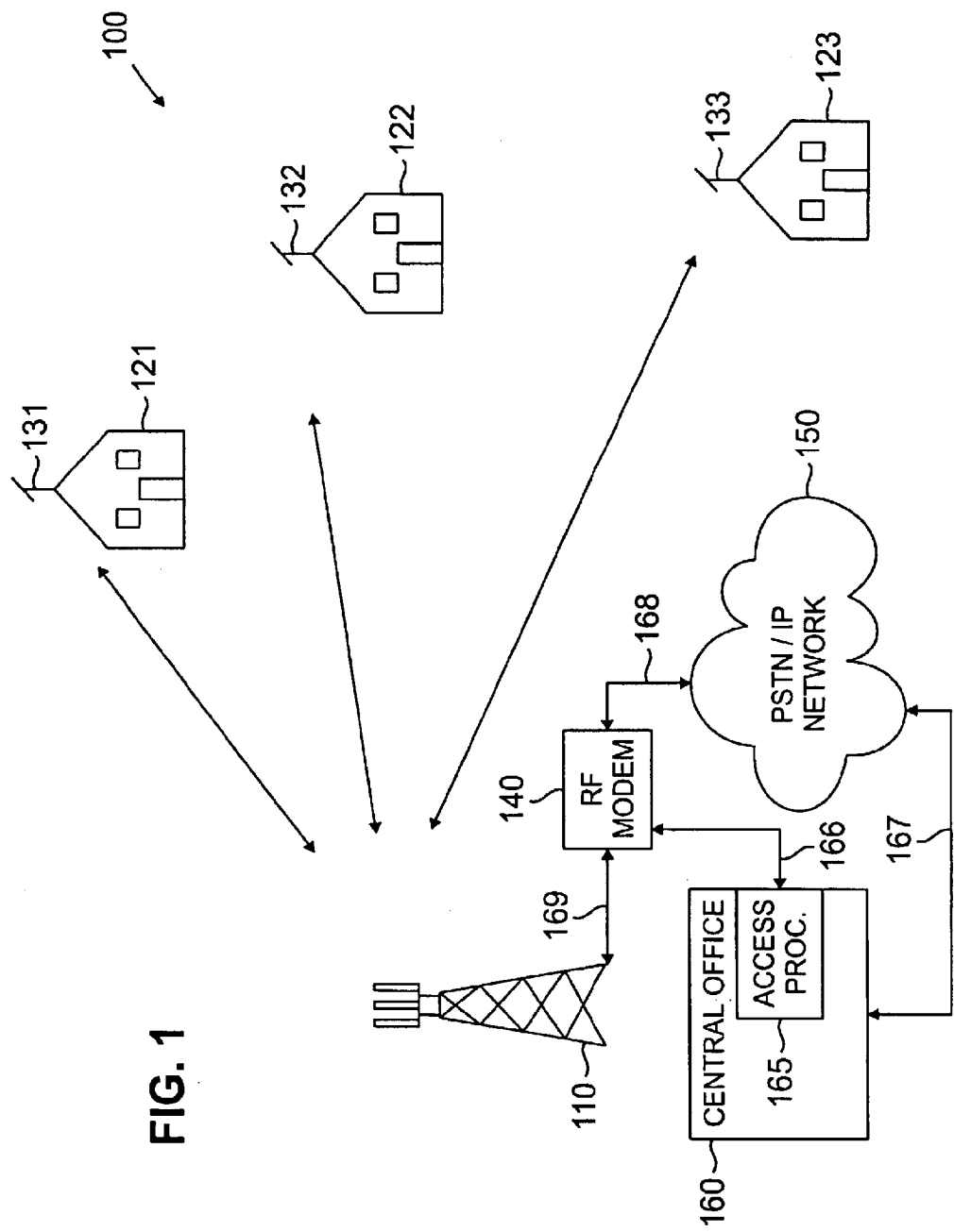
FIG. 1 illustrates an exemplary fixed wireless access network according to one embodiment of the present invention.

FIG. 1 illustrates exemplary fixed wireless access network 100 according to one embodiment of the present invention. Fixed wireless network 100 comprises a plurality of transceiver base stations, including exemplary transceiver base station 110, that transmit forward channel (i.e., downlink or downstream) broadband signals to a plurality of subscriber premises, including exemplary subscriber premises 121, 122 and 123, and receive reverse channel (i.e., uplink or upstream) broadband signals from the plurality of subscriber premises. Subscriber premises 121–123 transmit and receive via fixed, externally-mounted antennas 131–133, respectively. Subscriber premises 121–123 may comprise many different types of residential and commercial buildings, including single family homes, multi-tenant offices, small business enterprises (SBE), medium business enterprises (MBE), and so-called "SOHO" (small office/home office) premises.

The transceiver base stations, including transceiver base station 110, receive the forward channel (i.e., downlink) signals from external network 150 and transmit the reverse channel (i.e., uplink) signals to external network 150. External network 150 may be, for example, the public switched telephone network (PSTN) or one or more data networks, including the Internet or proprietary Internet protocol (IP) wide area networks (WANs) and local area networks (LANs). Exemplary transceiver base station 110 is coupled to RF modem shelf 140, which, among other things, up-converts baseband data traffic received from external network 150 to RF signals transmitted in the forward channel to subscriber premises 121–123. RF modem shelf 140 also down-converts RF signals received in the reverse channel from subscriber premises 121–123 to baseband data traffic that is transmitted to external network 150.

RF modem shelf 140 comprises a plurality of RF modems capable of modulating (i.e., up-converting) the baseband data traffic and demodulating (i.e., down-converting) the reverse channel RF signals. In an exemplary embodiment of the present invention, each of the transceiver base stations covers a cell site area that is divided into a plurality of sectors. In an advantageous embodiment of the present invention, each of the RF modems in RF modem shelf 140 may be assigned to modulate and demodulate signals in a particular sector of each cell site. By way of example, the cell site associated with transceiver base station 110 may be partitioned into six sectors and RF modem shelf 140 may comprise six primary RF modems (and, optionally, a seventh spare RF modem), each of which is assigned to one of the six sectors in the cell site of transceiver base station 110. In another advantageous embodiment of the present invention, each RF modem in RF modem shelf 140 comprises two or more RF modem transceivers which may be assigned to at least one of the sectors in the cell site. For example, the cell site associated with transceiver base station 110 may be partitioned into six sectors and RF modem shelf 140 may comprise twelve RF transceivers that are assigned in pairs to each one of the six sectors. The RF modems in each RF modem pair may alternate modulating and demodulating the downlink and uplink signals in each sector.

RF modem shelf 140 is located proximate transceiver base station 110 in order to minimize RF losses in communication line 169. RF modem shelf 140 may receive the baseband data traffic from external network 150 and transmit the baseband data traffic to external network 150 via a number of different paths. In one embodiment of the present invention, RF modem shelf 140 may transmit baseband data traffic to, and receive baseband data traffic from, external network 150 through central office facility 160 via communication lines 166 and 167. In such an embodiment, communication line 167 may be a link in a publicly owned or privately owned backhaul network. In another embodiment of the present invention, RF modem shelf 140 may transmit baseband data traffic to, and receive baseband data traffic from, external network 150 directly via communication line 168 thereby bypassing central office facility 160.

Central office facility 160 comprises access processor shelf 165. Access processor shelf 165 provides a termination of data traffic for one or more RF modem shelves, such as RF modem shelf 140. Access processor shelf 165 also provides termination to the network switched circuit interfaces and/or data packet interfaces of external network 150. One of the principal functions of access processor shelf 165 is to concentrate data traffic as the data traffic is received from external network 150 and is transferred to RF modem shelf 140. Access processor shelf 165 provides data and traffic processing of the physical layer interfaces, protocol conversion, protocol management, and programmable voice and data compression.

Figure 2:
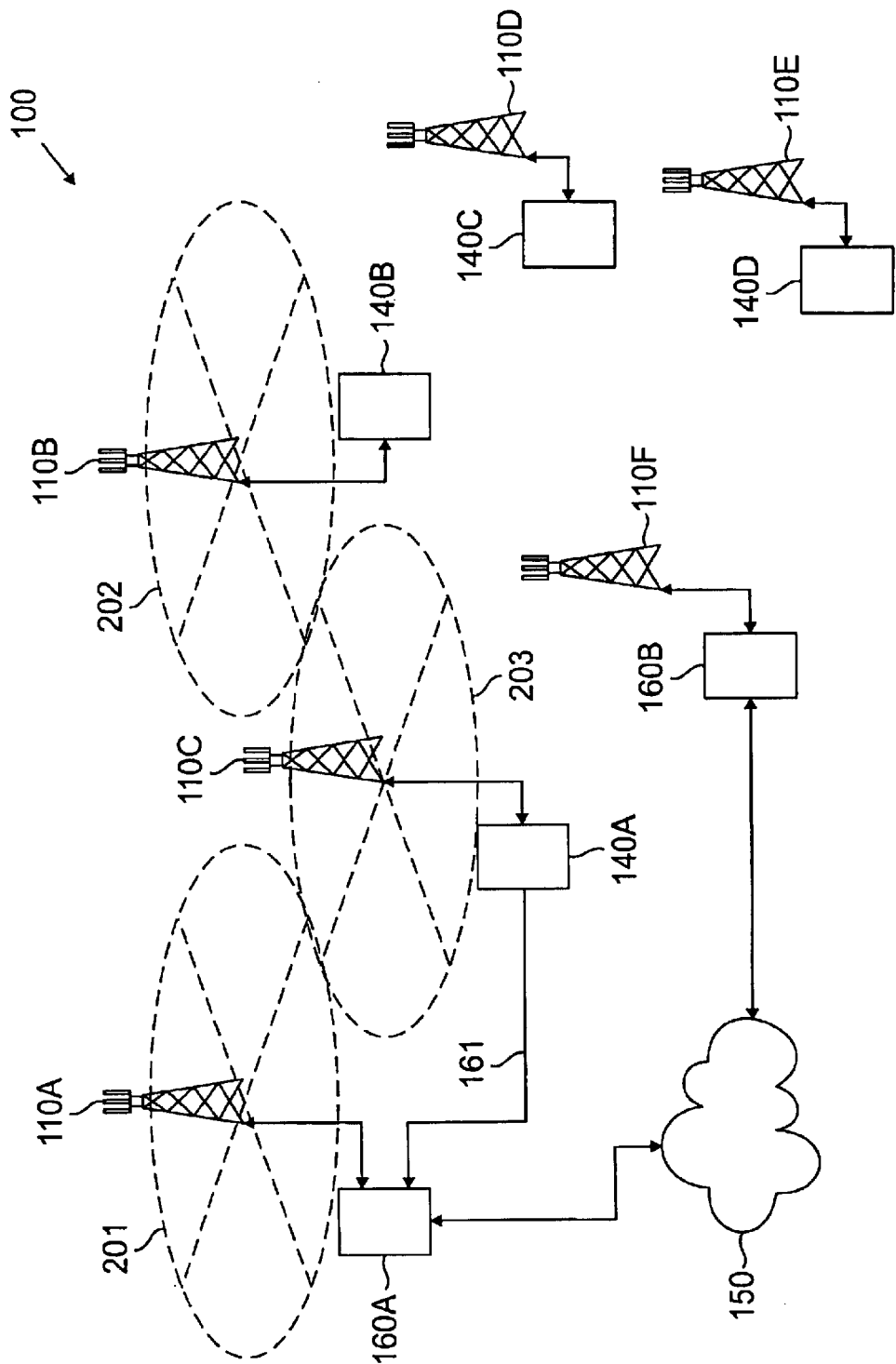
FIG. 2 illustrates in greater detail an alternate view of selected portions of the exemplary fixed wireless access network according to one embodiment of the present invention.

FIG. 2 illustrates in greater detail an alternate view of selected portions of exemplary fixed wireless access network 100 according to one embodiment of the present invention. FIG. 2 depicts additional transceiver base stations, including exemplary transceiver base stations 110A through 110F, central office facilities 160A and 160B, and remote RF modem shelves 140A through 140D. Central office facilities 160A and 160B comprise internal RF modems similar to RF modem shelves 140A through 140D. Transceiver base stations 110A, 110B, and 110C are disposed in cells sites 201, 202, and 203, respectively. In the exemplary embodiment, cell sites 201–203 (shown in dotted lines) are partitioned into four sectors each. In alternate embodiments, sites 201, 202, and 203 may be partitioned into a different number of sectors, such as six sectors, for example.

As in FIG. 1, RF modem shelves 140A–140D and the internal RF modems of central office facilities 160A and 160B transmit baseband data traffic to, and receive baseband data traffic from, access processors in central office facilities 160A and 160B of the PSTN. RF modem shelves 140A–140D and the internal RF modems of central office facilities 160A and 160B also up-convert incoming baseband data traffic to RF signals transmitted in the forward (downlink) channel to the subscriber premises and down-convert incoming RF signals received in the reverse (uplink) channel to baseband data traffic that is transmitted via a backhaul network to external network 150.

Baseband data traffic may be transmitted from remote RF modem shelves 140A–140D to central office facilities 160A and 160B by a wireless backhaul network or by a wireline backhaul network, or both. As shown in FIG. 2, baseband data traffic is carried between central office facility 160A and remote RF modem 140A by a wireline backhaul network, namely wireline 161, which may be, for example, a DS3 line or one to N T1 lines. A local multipoint distribution service (LMDS) wireless backhaul network carries baseband data traffic between central office facilities 160A and 160B and remote RF modem shelves 140B, 140C, and 140D. In a LMDS wireless backhaul network, baseband data traffic being sent to remote RF modem shelves 140B, 140C, and 140D is transmitted by microwave from microwave antennas mounted on transceiver base stations 110A, 110C, and 110F to microwave antennas mounted on transceiver base stations 110B, 110D, and 110E. Baseband data traffic being sent from remote RF modem shelves 140B, 140C, and 140D is transmitted by microwave in the reverse direction (i.e., from transceiver base stations 110B, 110D, and 110E to transceiver base stations 110A, 110C, and 110F).

At each of transceiver base stations 110B, 110D, and 110E, downlink data traffic from central office facilities 160A and 160B is down-converted from microwave frequencies to baseband signals before being up-converted again for transmission to subscriber premises within each cell site. Uplink data traffic received from the subscriber premises is down-converted to baseband signals before being up-converted to microwave frequencies for transmission back to central office facilities 160A and 160B.

Generally, there is an asymmetry of data usage in the downlink and the uplink. This asymmetry is typically greater than 4:1 (downlink:uplink). Taking into account the factors of data asymmetry, channel propagation, and available spectrum, an advantageous embodiment of the present invention adopts a flexible approach in which the physical (PHY) layer and the media access (MAC) layer are based on the use of time division duplex (TDD) time division multiple access (TDMA). TDD operations share a single RF channel between a transceiver base station and a subscriber premises and use a series of frames to allocate resources between each user uplink and downlink. A great advantage of TDD operation is the ability to dynamically allocate the portions of a frame allocated between the downlink and the uplink. This results in an increased efficiency of operation relative to frequency division duplex (FDD) techniques. TDD operations typically may achieve a forty to sixty percent advantage in spectral efficiency over FDD operations under typical conditions. Given the short duration of the transmit and receive time slots relative to changes in the channel, TDD operations also permit open loop power control, switched diversity techniques, and feedforward and cyclo-stationary equalization techniques that reduce system cost and increase system throughput.

Figure 3:
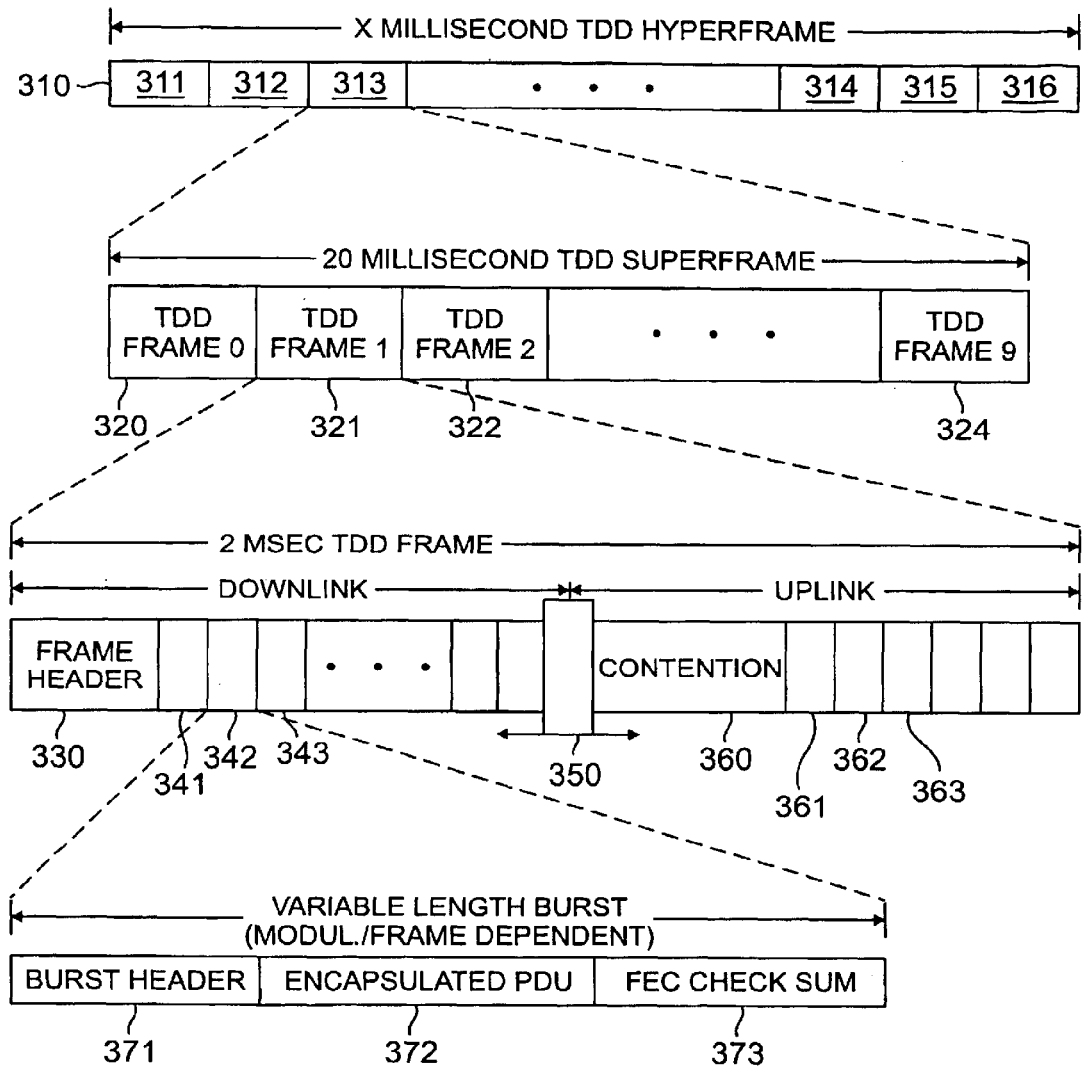
FIG. 3 illustrates an exemplary time division duplex (TDD) time division multiple access (TDMA) frame according to one embodiment of the present invention.

To aid with periodic functions in the system, TDD frames are grouped into superframes (approximately 10 to 20 milliseconds). The superframes are further grouped into hyperframes (approximately 250 to 1000 milliseconds). This provides a coordinated timing reference to subscriber integrated access devices in the system. FIG. 3 illustrates exemplary time division duplex (TDD) time division multiple access (TDMA) framing hierarchy according to one embodiment of the present invention. At the highest level, the TDD-TDMA framing hierarchy comprises hyperframe 310, which is X milliseconds in length (e.g., 250 msec.<X<1000 msec.). Hyperframe 310 comprises N superframes, including exemplary superframes 311–316. Each of superframes 311–316 is 20 milliseconds in duration.

Superframe 313 is illustrated in greater detail. Superframe 313 comprises ten (10) TDD frames, including exemplary TDD frames 321–324, which are labeled TDD Frame 0, TDD Frame 1, TDD Frame 2, and TDD Frame 9, respectively. In the exemplary embodiment, each TDD frame is 2 milliseconds in duration. A TDD transmission frame is based on a fixed period of time during which access to the channel is controlled by the transceiver base station.

Exemplary TDD frame 321 is illustrated in greater detail. TDD frame 321 comprises a downlink portion (i.e., base station to subscriber transmission) and an uplink portion (i.e., subscriber to base station transmission). In particular, TDD frame 321 comprises:

Frame header 330—Frame header 330 is a broadcast message that synchronizes the start of frame and contains access control information on how the remainder of TDD frame 321 is configured. The modulation format of frame header 330 is chosen so that all subscribers in a sector of the transceiver base station can receive frame header 330.

D downlink slots—The D downlink slots, including exemplary downlink slots 341–343, contain transceiver base station-to-subscriber transmissions of user traffic and/or control signals. The modulation format is optimized for maximum possible data transmission rates.

U uplink slots—The U uplink slots, including exemplary uplink slots 361–363, contain subscriber-to-transceiver base station transmissions of user traffic and/or control signals. Again, the modulation format is optimized for maximum possible data transmission rates.

Contention slots 360—Contention slots 360 precede the U uplink slots and comprise a small number of subscriber-to-base transmissions that handle initial requests for service. A fixed format length and a single modulation format suitable for all subscriber access devices are used during contention slots 360. Collisions (more than one user on a time slot) result in the use of back-off procedures similar to CSMA/CD (Ethernet) in order to reschedule a request.

TDD transition period 350—TDD transition period 350 separates the uplink portion and the downlink portion and allows for transmitter (TX) to receiver (RX) propagation delays for the maximum range of the cell link and for delay associated with switching hardware operations from TX to RX or from RX to TX. The position of TDD transition period 350 may be adjusted, thereby modifying the relative sizes of the uplink portion and the downlink portion to accommodate the asymmetry between data traffic in the uplink and the downlink.

Exemplary downlink slot 341 is show in greater detail. Downlink slot 341 comprises burst header 371, encapsulated packet data unit (PDU) 372, and forward error correction check sum value 373. The length of downlink slot 341 varies according to the modulation format used communicate with the subscriber access device to which downlink slot 341 is transmitted. The other downlink slots and uplink slots in TDD frame 321 are similar in structure to downlink slot 341.

Figure 4:
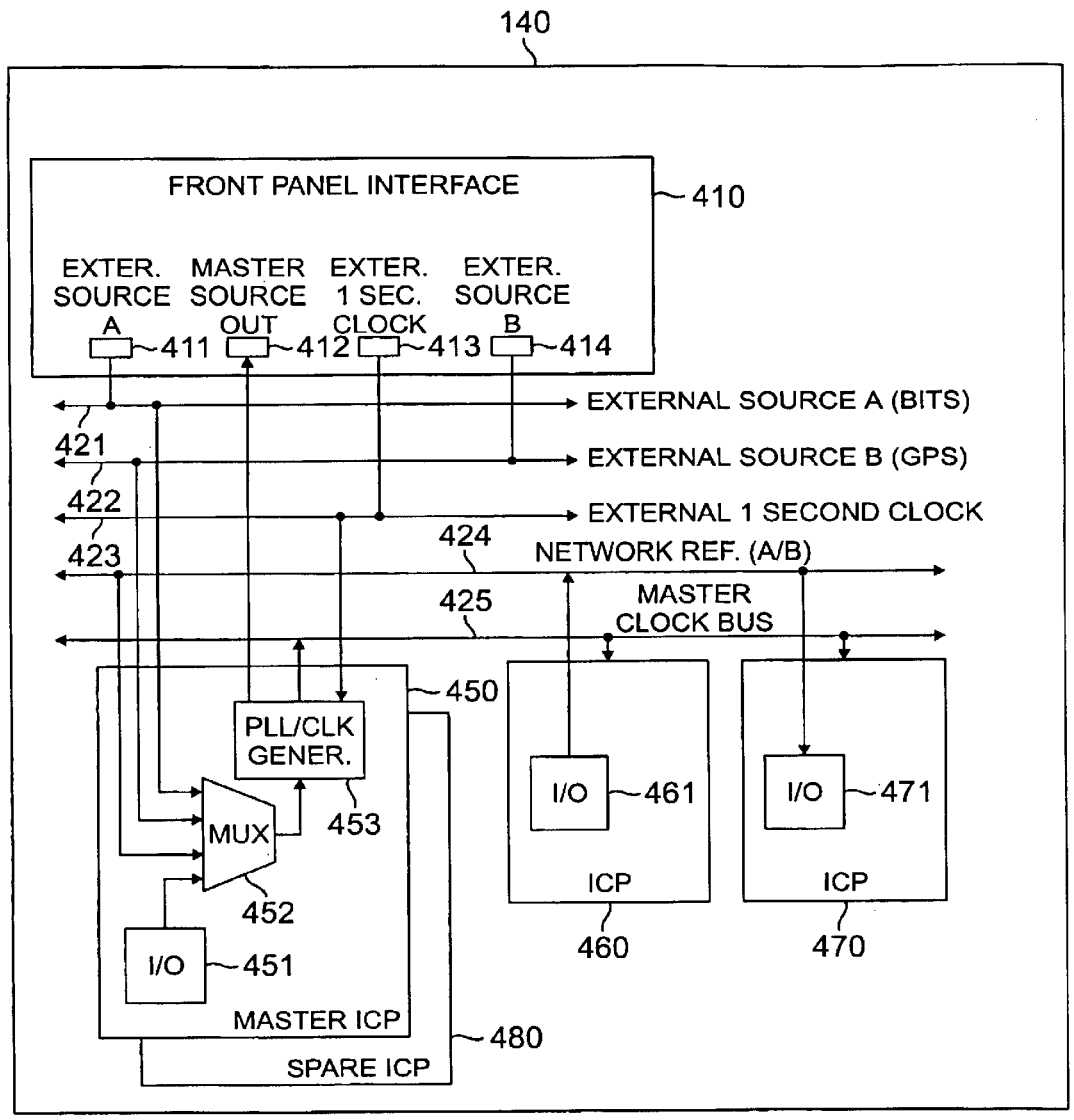
FIG. 4 illustrates the timing recovery and distribution circuitry in an exemplary RF modem shelf according to one embodiment of the present invention.

FIG. 4 illustrates the timing recovery and distribution circuitry in exemplary RF modem shelf 140 according to one embodiment of the present invention. RF modem shelf 140 comprises front panel interface 410 having connectors 411–414 for receiving input clock references and transmitting clock references. Exemplary connector 411 receives a first clock signal from a first external source (External Source A) and exemplary connector 414 receives a second clock signal from a second external source (External Source B). Connector 412 outputs an internally generated clock signal (Master Source Out) and connector 413 receives an external one second system clock signal (External 1 Second Clock).

RF modem shelf 140 also comprises a plurality of interface control processor (ICP) cards, including exemplary ICP cards 450, 460, 470 and 480. ISP card 450 is designated as a master ICP card and ICP card 480 is designated as a spare ICP card in case of a failure of master ICP card 450. Within RF modem shelf 140, the ICP cards provide for control functions, timing recovery and distribution, network interface, backhaul network interface, protocol conversion, resource queue management, and a proxy manager for EMS for the shelf. The ICP cards are based on network processor (s) that allow software upgrade of network interface protocols. The ICP cards may be reused for control and routing functions and provide both timing and critical TDD coordinated burst timing for all the RF modems in RF modem shelf 140 and for shelf-to-shelf timing for stacked frequency high density cell configurations.

The timing and distribution architecture in RF modem shelf 140 allows for three reference options:

Primary—An external input derived from another remote modem shelf acting as a master. BITS (Building Integrated Timing Supply) reference is a single building master timing reference (e.g., External Source A, External Source B) that supplies DS1 and DS0 level timing throughout an office (e.g., 64K or 1.544/2.048 Mbps).

Secondary—A secondary reference may be derived from any designated input port in RF modem shelf 140. For remote RF modem shelf 140, this is one of the backhaul I/O ports. An ICP card is configured to recover a timing source and that source is placed on a backplane as a reference (i.e., Network Reference (A/B)) to master ICP card 450.

Tertiary—An internal phase locked loop (PLL) may be used.

By default, two ICP cards are configured as a master ICP card and a spare ICP card. The active master ICP card distributes timing for all of RF modem shelf 140. The timing distribution architecture of RF modem shelf 140 meets Stratum 3 levels of performance, namely a free-run accuracy of +/−4.6 PPM (parts per million), a pull-in capability of 4.6 PPM, and a holdover stability of less than 255 slips during the first day.

There are three components to the timing distribution for the access processor backplane:

1. Timing masters (ICP cards 450 and 480).
2. Timing slaves (ICP cards 460 and 470).
3. Timing references.

The timing masters are capable of sourcing all clocks and framing signals necessary for the remaining cards within the AP backplane. Within a backplane, there are two timing masters (ICP cards 450 and 480), which are constrained to the slots allocated as the primary and secondary controllers. The timing masters utilize the redundant timing references (External Source A, External Source B, External 1 Second Clock) found on the backplane to maintain network-qualified synchronization. ISP card 450 (and ISP card 480) comprises backhaul network input/output (I/O) port 451, multiplexer 452 and PLL-clock generator 453. MUX 452 selects anyone of External Source A, External Source B, Network Reference (A/B), and the signal from I/O port 451 to be applied to PLL-clock generator 453. The timing master has missing clock detection logic that allows it to switch from one timing reference to another in the event of a failure.

Timing is distributed across a redundant set of clock and framing signals, designated Master Clock Bus in FIG. 4. Each timing master (i.e., ICP cards 450 and 480) is capable under software control of driving either of the two sets of clock and framing buses on the backplane. Both sets of timing buses are edge-synchronous such that timing slaves can interoperate while using either set of clocks.

The timing supplied by the timing master (e.g., ICP card 450) consists of a 65.536 MHZ clock and an 8 KHz framing reference. There is a primary and secondary version of each reference. To generate these references, the primary and secondary timing masters are provisioned to recover the timing from one of the following sources:

TABLE 3.1-1

Clock Sources Interface Definitions

| Source | Connector | Frequency |
|---|---|---|
| External BITS (EXT REF A) | 75/120 Ohm BNC | 64K, 1544K, 2048K |
| External BITS/GPS (EXT REF B) | 75/120 Ohm, DB9 | 64K, 1544K, 2048K |
| External GPS Sync Pulse | 75/120 Ohm, DB9 | 1 sec pulse |
| On card Reference | Digital Logic Level | Per I/O reference |
| Network I/O derived Reference A | Digital logic Level | Per I/O reference |
| Network I/O derived Reference B | Digital logic Level | Per I/O reference |

To simplify clock distribution and to provide redundancy all the clocks are derived from a common clock source. The following table summarizes the backplane reference clocks as well as the clock rates of the various backplane resources and how they are derived from these references.

TABLE 3.1-2

Busses and Associated Clocks

| Clock | Frequency | Division or Ratio |
|---|---|---|
| Common Reference Clock | 65.53 MHZ | Not Applicable |
| Common Sync Pulse | 1 Hz | Not Applicable |
| Framing Reference | 8 KHz (125 usec) | Free-run framing provided by Primary or Secondary Clock Masters Referenced to to Common Reference Clock |
| Cell/Packet Clock Rate | 32.768 MHZ | Reference Clock/2 |
| TDM Bus Rate | 8.192 MHZ | Reference Clock/8 |
| RF Reference Clock | 10.000 MHZ | Free-run RF reference clock |
| Communications Bus | 100 MHZ | Derived from free-run Reference Clock |
| High-speed Serial Links | 1.31072 GHz | Ref Clock × 20 |

Timing slaves (i.e., ICP cards 460 and 470) receive the timing provided by redundant sets of clock and framing buses. Under software control, timing slaves choose a default set of clocks from either the A-side or B-side timing buses. They also contain failure detection logic such that clock and framing signal failures can be detected. Once a clock or framing failure is detected, the timing slave automatically switches to the alternate set of timing buses. ICP cards 460 and 470 contain backhaul I/O ports 461 and 471, respectively, which may be used to bring in external timing signals from other RF modem shelves in the network. The timing masters (i.e., ICP cards 450 and 480) also contain the timing slave function insofar as they also utilize the timing provided on the backplane clock and framing buses.

A qualified timing reference is required for the timing master to derive backplane timing and to maintain synchronization within network 100 and with any outside network. Under software control, an access processor card can be assigned to derive this timing and to drive one of the two timing reference buses. Ideally, a second, physically separate card will contain a second qualified timing source and drive the second backplane timing reference.

In the event that no qualified timing is present from trunk interfaces, the access processor backplane has connections which allow external reference timing (e.g., a GPS-derived clock) from the interface tray to be applied to the backplane. A one pulse-per-second (1 PPS) signal is distributed to all system cards for time stamping of system events and errors. Installations involving multiple access processor shelves require the timing reference to be distributed between all access processor backplanes. In this scenario, the timing reference for a given backplane is cabled to the remaining backplanes through external cabling. Multiple remote modem shelves are utilized to distribute high-capacity backhaul traffic to one or more additional co-located modem shelves. Traffic is distributed among the shelves through T1 circuits. To maintain network timing, the additional shelves are slaved to these distribution links and recover timing through the same PLL mechanisms as the head-end shelf.

Figure 5:
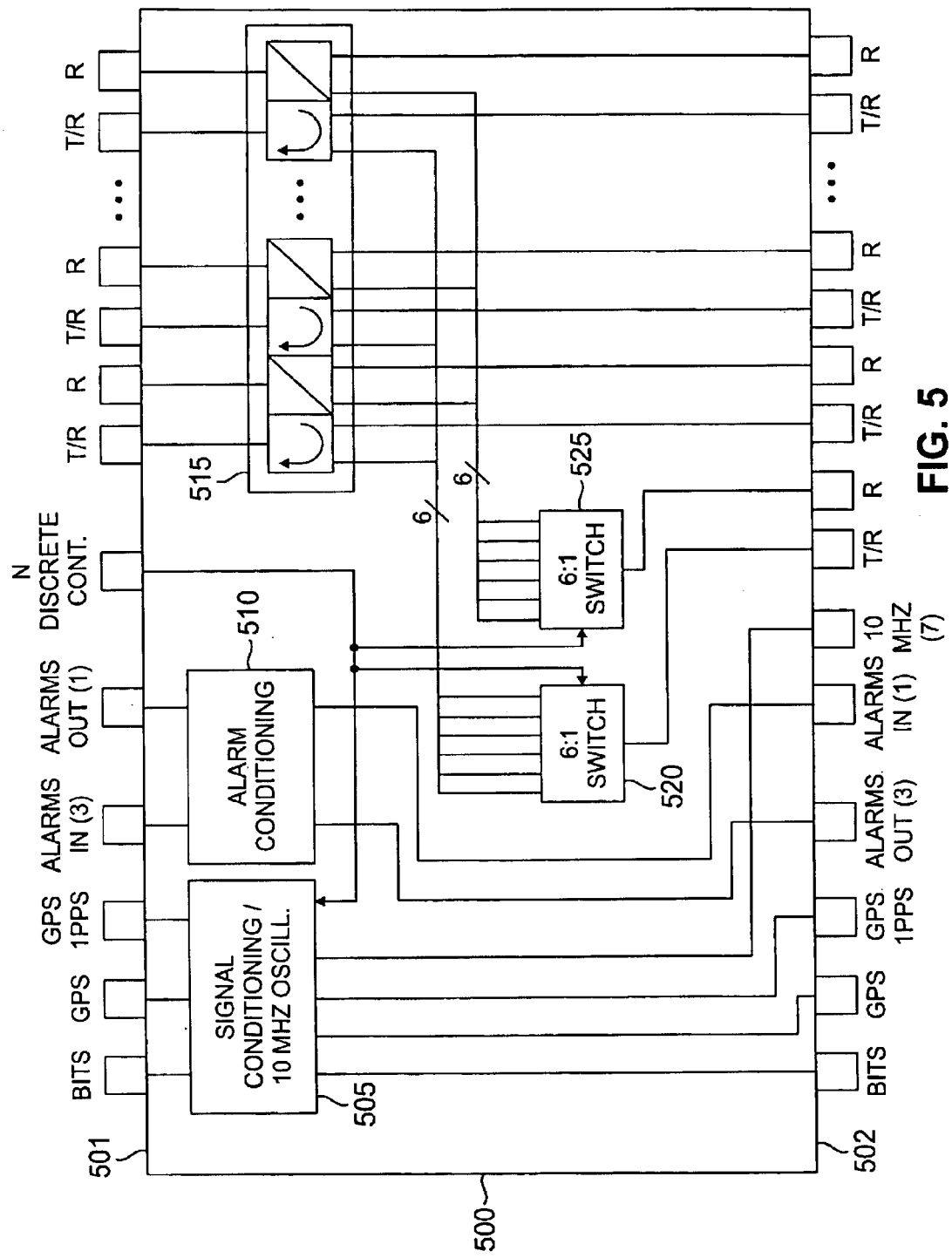
FIG. 5 illustrates an interface tray in an exemplary RF modem shelf according to one embodiment of the present invention.

FIG. 5 illustrates exemplary interface tray 500 associated with RF modem shelf 140 according to one embodiment of the present invention. Interface tray 500 comprises signal conditioning-10 MHz oscillator circuitry 505, alarm conditioning circuitry 510, RF circulator-power divider circuitry 515, and 6:1 switches 520 and 525. Exemplary interface tray 500, located above remote modem shelf 140, is the junction at which the cell site antennas and the RF modems interconnect. Interface tray 500 provides N+1 redundancy among the RF modems in RF modem shelf 140, using an RF distribution circuit housed within interface tray 500. In addition to the antenna feeds, all external alarms, the BITS and GPS timing signals, control signals, and power supplies (not shown) are interfaced through interface tray 500. Access processor shelf 165 shares the same interface tray design.

All access to the cell tower antennas, alarms, power, I$^2$C, and BITS timing and GPS signals are accomplished through rear panel 501 of interface tray 500. RF signals supplied to the RF modem cards are received through front panel 502 of the tray. All communications and control with interface tray 500 are done via discrete connections. Control functions with interface tray 500 via the remote modem ICP cards are:

1. Switching of antennas to the redundant RF Modem
2. Alarm indications from external alarms
3. CO Output Alarm Indication Any external alarms that are detected are conditioned as necessary by alarm conditioning circuitry 510 for output to the primary and secondary master ICP cards in remote RF modem shelf 140 via the discrete interconnections. For CO alarm requirements, the system will output an alarm to the facility switching equipment via relay contact closure.

Interface tray 500 serves three timing input sources, namely the BITS signal, the GPS signal, and the GPS 1 PPS signal. These timing signals are conditioned by signal conditioning-10 MHz oscillator circuitry 505, as required, before being transmitted out front panel 502 for interfacing to RF modem shelf 140. Interface tray 500 supports diversity reception required by the RF modems. One channel of the diversity pair is dedicated to transmission. That channel is fed by one of the RF circulators in RF circulator-power divider circuitry 515 to allow for transmission and reception and to support redundant switchover. The second channel is a receive-only channel. One of the RF power dividers in RF circulator-power divider circuitry 515 feeds the receive only channel.

To provide N+1 redundancy in the remote modem shelf 140, a switchover scheme must be devised. For the purposes of discussion, a six sector cell site is assumed. In this scheme, both RF feeds for each RF modem channel must be fed to one of 6:1 switches 520 and 525. Switching is chosen over power division to reduce the path loss through the channel versus a power division scheme. All of the TX/RX signals are fed to 6:1 switch 520 and all of the RX only signals are to 6:1 switch 525. Upon detection of an RF modem failure, master ICP card 450 is notified and the spare modem is switched in.

There is a stable 10 MHz oscillator circuit in signal conditioning-10 MHz oscillator circuitry 505 in interface tray 500. The 10 MHz signal is used to phase reference all of the RF modem cards. A low-cost backup oscillator is available in interface tray 500 in the event of failure of the primary oscillator. The backup oscillator is phased locked with the GPS signal to allow for enough stability to operate until maintenance can be performed on interface tray 500.

Although the present invention has been described in detail, those skilled in the art should understand that they can make various changes, substitutions and alterations herein without departing from the spirit and scope of the invention in its broadest form.

What is claimed is:

1. For use in a first radio frequency (RF) modem shelf associated with a first one of a plurality of base stations in a fixed wireless access network, a timing distribution apparatus for synchronizing the operations of a plurality of RF modems in said first RF modem shelf comprising:
    a primary master clock source capable of generating an internal master clock signal and an internal master framing signal;
    a plurality of interface control processors, each of said interface control processors capable of receiving said internal master clock signal and said internal master framing signal and capable of using said internal master clock signal and said internal master framing signal to synchronize a downlink transmission of one of said plurality of RF modems;
    a synchronization bus capable of distributing said internal master clock signal and said internal master framing signal from said primary master clock source to said plurality of interface control processors;
    an external interface input port capable of receiving at least one external master synchronization signal from a second RF modem shelf in said fixed wireless access network; and
    an external interface output port capable of receiving at least one of said internal master clock signal and said internal master framing signal from said primary master clock source and transmitting said at least one of said internal master clock signal and said internal master framing signal to said second RF modem shelf.

2. The timing distribution apparatus as set forth in claim 1 further comprising a secondary master clock source capable of generating said internal master clock signal and said internal master framing signal.

3. The timing distribution apparatus as set forth in claim 2 wherein said synchronization bus comprises a primary timing bus capable of distributing said internal master clock signal and said internal master framing signal from said primary master clock source and a secondary timing bus capable of distributing said internal master clock signal and said internal master framing signal from said secondary master clock source.

4. The timing distribution apparatus as set forth in claim 3 wherein said primary master clock source generates said internal master clock signal and said internal master framing signal from said at least one external master synchronization signal.

5. The timing distribution apparatus as set forth in claim 4 wherein said secondary master clock source generates said internal master clock signal and said internal master framing signal from said at least one external master synchronization signal.

6. The timing distribution apparatus as set forth in claim 3 wherein said external interface input port is further capable of receiving a building integrated timing supply (BITS) reference signal from a locally disposed external clock source.

7. The timing distribution apparatus as set forth in claim 6 wherein said primary master clock source generates said internal master clock signal and said internal master framing signal from said BITS reference signal.

8. The timing distribution apparatus as set forth in claim 7 wherein said secondary master clock source generates said internal master clock signal and said internal master framing signal from said BITS reference signal.

9. The timing distribution apparatus as set forth in claim 3 wherein said external interface input port is further capable of receiving a global positioning system (GPS) reference signal from an external GPS clock source.

10. The timing distribution apparatus as set forth in claim 9 wherein said primary master clock source generates said internal master clock signal and said internal master framing signal from said GPS reference signal.

11. A fixed wireless access network comprising:
    a plurality of transceiver base stations capable of bidirectional wireless communication with a plurality of wireless access devices disposed at a plurality of subscriber premises; and
    a plurality of radio frequency (RF) modem shelves associated with said plurality of transceiver base stations, a first one of said plurality of RF modem shelves comprising a timing distribution apparatus for synchronizing the operations of a plurality of RF modems in said first RF modem shelf, wherein said timing distribution apparatus comprises:
        a primary master clock source capable of generating an internal master clock signal and an internal master framing signal;
        a plurality of interface control processors, each of said interface control processors capable of receiving said internal master clock signal and said internal master framing signal and capable of using said internal master clock signal and said internal master framing signal to synchronize a downlink transmission of one of said plurality of RF modems;

a synchronization bus capable of distributing said internal master clock signal and said internal master framing signal from said primary master clock source to said plurality of interface control processors;

an external interface input port capable of receiving at least one external master synchronization signal from a second RF modem shelf in said fixed wireless access network; and an external interface output port capable of receiving at least one of said internal master clock signal and said internal master framing signal from said primary master clock source and transmitting said at least one of said internal master clock signal and said internal master framing signal to said second RF modem shelf.

12. The fixed wireless access network as set forth in claim 11 further comprising a secondary master clock source capable of generating said internal master clock signal and said internal master framing signal.

13. The fixed wireless access network as set forth in claim 12 wherein said synchronization bus comprises a primary timing bus capable of distributing said internal master clock signal and said internal master framing signal from said primary master clock source and a secondary timing bus capable of distributing said internal master clock signal and said internal master framing signal from said secondary master clock source.

14. The fixed wireless access network as set forth in claim 13 wherein said primary master clock source generates said internal master clock signal and said internal master framing signal from said at least one external master synchronization signal.

15. The fixed wireless access network as set forth in claim 14 wherein said secondary master clock source generates said internal master clock signal and said internal master framing signal from said at least one external master synchronization signal.

16. The fixed wireless access network as set forth in claim 13 wherein said external interface input port is further capable of receiving a building integrated timing supply (BITS) reference signal from a locally disposed external clock source.

17. The fixed wireless access network as set forth in claim 16 wherein said primary master clock source generates said internal master clock signal and said internal master framing signal from said BITS reference signal.

18. The fixed wireless access network as set forth in claim 17 wherein said secondary master clock source generates said internal master clock signal and said internal master framing signal from said BITS reference signal.

19. The fixed wireless access network as set forth in claim 13 wherein said external interface input port is further capable of receiving a global positioning system (GPS) reference signal from an external GPS clock source.

20. The fixed wireless access network as set forth in claim 19 wherein said primary master clock source generates said internal master clock signal and said internal master framing signal from said GPS reference signal.

* * * * *